United States Patent [19]

Shirai

[11] 3,731,357
[45] May 8, 1973

[54] APPARATUS FOR ADJUSTING THE ALTITUDE OF THE CHORD OF AN EXPANDING ROLL

[75] Inventor: Masayuki Shirai, Osaka, Japan

[73] Assignee: Yamauchi Rubber Industry Co., Ltd., Osaka, Japan

[22] Filed: June 16, 1971

[21] Appl. No.: 153,519

[30] Foreign Application Priority Data

June 15, 1970 Japan..................................45/55524

[52] U.S. Cl.............................................29/116 AD
[51] Int. Cl. ............................................B21b 13/02
[58] Field of Search .....................29/116 AD, 116 R; 26/63

[56] References Cited

UNITED STATES PATENTS

| | | | |
|---|---|---|---|
| 2,547,975 | 4/1951 | Robertson....................... | 29/116 R X |
| 2,960,749 | 11/1960 | Robertson et al............... | 29/116 R X |
| 3,213,513 | 10/1965 | Robertson....................... | 29/116 R X |
| 3,308,519 | 3/1967 | Westgate ........................ | 29/116 R X |
| 3,500,524 | 3/1970 | Jagminas ........................ | 29/116 R |
| 3,357,073 | 12/1967 | Eury................................ | 26/63 |
| 3,376,620 | 4/1968 | Miller.............................. | 26/63 |

*Primary Examiner*—Alfred R. Guest
*Attorney*—Woodhams, Blanchard and Flynn

[57] ABSTRACT

An apparatus for adjusting the altitude of the chord of an expanding roll characterized in comprising; a central shaft bent in an arc-shape with the amount of its radial deflection increasing progressively toward the middle thereof from an imaginary straight line corresponding to the axis of an unbent central shaft; a plurality of eccentric discs or bushes rotatably fitted around said shaft and being spaced lengthwise along the axis thereof, said bushes having the their eccentricities increasing progressively toward the middle of said central shaft; a plurality of sleeves, in which said bushes are rotatably disposed respectively; a rubber roll covering said sleeves and integrated therewith to form a single rotatably unit; a plurality of tubular coupling members rotatably fitted around said central shaft between said bushes and coupling with adjacent bushes; rotating means fixedly disposed on an outwardly extending portion of the central shaft for the purpose of rotating said tubular coupling members; and a bearing journaling said central shaft so as to keep said central shaft fixed thereto and, in case of need, to permit said shaft to turn round therein.

5 Claims, 7 Drawing Figures

PATENTED MAY 8 1973 3,731,357

INVENTOR.
MASAYUKI SHIRAI
BY
Williams, Blanchard & Flynn
ATTORNEYS

# APPARATUS FOR ADJUSTING THE ALTITUDE OF THE CHORD OF AN EXPANDING ROLL

BACKGROUND OF THE INVENTION

1. Field of the Invention

The present invention relates to an apparatus for adjusting the altitude of the chord of a roll for use in expanding a strip of synthetic resin film, metal foil, cloth, etc.

2. Description of the Prior Art

In the prior art, no device was provided to achieve such an adjustment as above-mentioned, whereas it is keenly desired to adjust the altitude of the chord, i.e., the deflecting distance between the center line of the central shaft actually bent in an arc-shape and an imaginary straight line corresponding to the axis of an unbent central shaft so as to satisfy such a requirement.

SUMMARY OF THE INVENTION

An object of the present invention is to provide an apparatus for adjusting the altitude of the chord of an expanding roll comprising a central shaft bent in an arc-shape; a plurality of eccentric discs or bushes fitted rotatably around said central shaft with spacing there between in the axial direction, said bushes having eccentricities increasing progressively toward the middle of said central shaft; a plurality of sleeves, supported for rotation on said bushes by intermediate ball bearings; and a rubber roll covering said sleeves and integrated therewith to form a single rotatable unit, said rubber roll thus being disposed eccentrically relative to said central shaft.

Another object of the present invention is to provide an apparatus for adjusting the altitude of the chord of an expanding roll, wherein said bushes are connected with each other by means of said tubular coupling members and further connected with said rotating means secured fast to a specified position within the bearing, so that all the bushes and tubular coupling members can be held stationary when the central shaft, is turned about its longitudinal axis and wherein, while said shaft is being turned, all the bushes and tubular coupling members appear as if rotated reversely relative to said central shaft and in the meantime are displaced horizontally, without changing their attitude relative to the vertical, so that the rubber roll moves from the original position so as to adjust the altitude of the chord thereof.

A still further object of the present invention is to provide an apparatus for adjusting the altitude of the chord of an expanding roll, wherein, when the central shaft is kept fixed in the bearing and said bushes and tubular coupling members are connected with said rotating means, operation of said rotating means effects a simultaneous rotation of said bushes as well as said tubular coupling members, so as to move the rubber roll as much as the bushes move, for adjusting the altitude of the chord thereof.

DETAILED DESCRIPTION OF THE INVENTION

Figure 1:
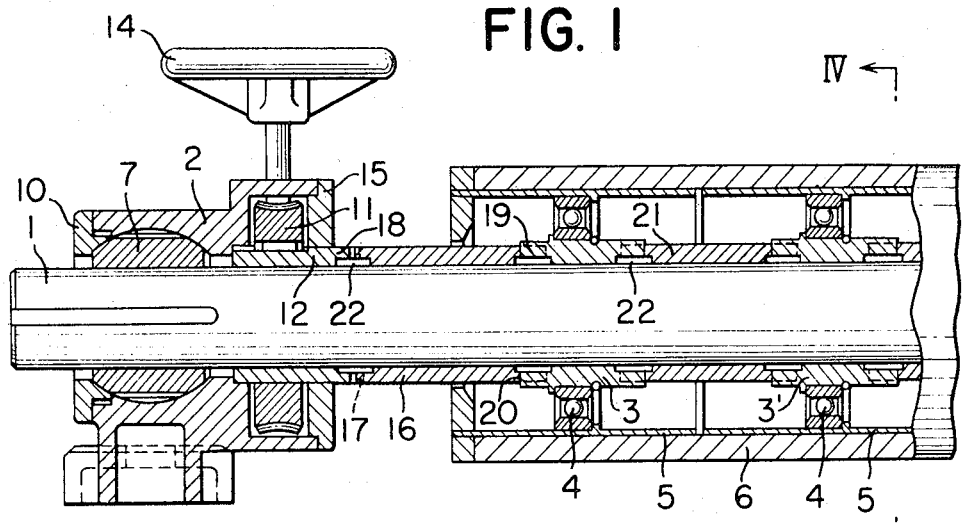
FIG. 1 is a partial longitudinal sectional view of the left end portion of a preferred embodiment of the present invention.
Figure 2:
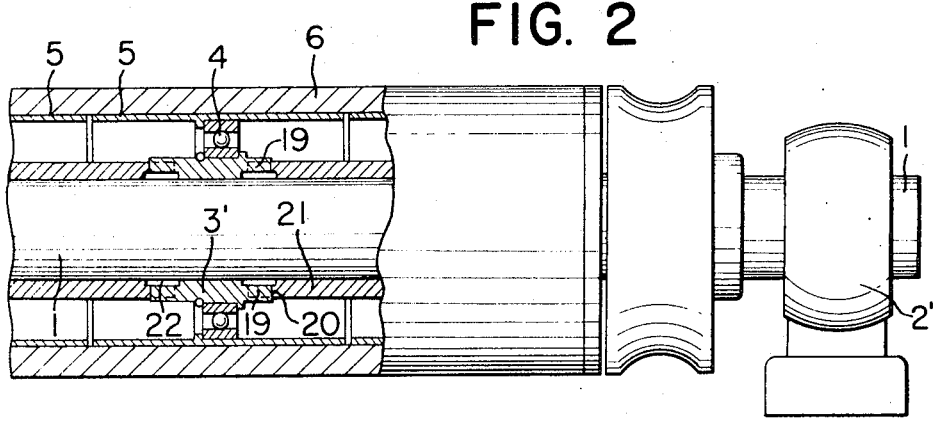
FIG. 2 is a partial longitudinal sectional front view showing the right end portion of the embodiment illustrated in FIG. 1.

Now, in reference to FIGS. 1 to 4, a description will be made of a preferred embodiment of the present invention.

An apparatus for adjusting the altitude of the chord of an expanding roll comprises a central shaft 1 journaled at its both ends by bearings 2,2'. The shaft 1 is deflected in such a manner that the magnitude of its deflection increases progressively toward the middle of the central shaft. A plurality of discs or bushes 3,3' whose eccentricities are progressively toward the middle of the central shaft, are fitted rotatably around said central shaft. A plurality of sleeves 5, are supported on said bushes by ball bearings so as to be rotatable thereon. A rubber roll 6 covers said sleeves 5 and is integrated therewith to form a single rotatable unit.

Within the middle portion of the bearing 2 which located at an end of the central shaft, a worm gear 7 is fixed to the central shaft, and a worm 8 is provided in said bearing 2, so as to drivingly engage the worm gear 7. A handle 9 is mounted fixedly to a shaft of said worm 8.

A cover 10 of the bearing 2 is fastened in an opening at one end of the bearing casing by screws in such a manner that said worm gear is fixed to the bearing.

The bearing 2 is further provided with a worm gear 11, which is disposed within the bearing casing in parallel to said worm gear 7, and into which is tightly inserted a connecting collar 12 which is rotatably mounted on the central shaft 1.

Moreover, the bearing 2 is provided with a worm 13 engaged with said worm gear 11 and then a handle 14 is fixed to said worm 13. A cover 15 is fastened to an opening at the other end casing of the bearing by screws.

The connecting collar 12 is provided at one end thereof with teeth 18, which engage with the teeth 17 formed on the opposing end of the sleeve 16. The other end of the sleeve 16 is provided with teeth 20, which engage with the teeth defined at an end of the adjacent eccentric bush 3.

The eccentric bushes are connected with each other by tubular coupling members 217 formed in the same fashion as of said sleeve 16,. The connecting collar 12, the sleeve 16, the eccentric bushes 3,3' and tubular coupling members 21 are all connected with one another by needle bearings 22, besides by said teeth 17, 18, 19 and 20.

These needle bearings 22 serve as bearings in order to journal each member on the central shaft 1, in addition to the connecting function.

Now, regarding the above-mentioned apparatus, a description will be made about how to adjust the altitude of the chord a rubber roll, with reference to FIG. 5X, 5Y and 5Z.

When it is desired to smooth away rumples as much as possible from the material to be subjected to expanding, the altitude (L) of the chord should be increased to the maximum extent. For this purpose, the roll should be set up in a normal position, in order to make the altitude of the chord maximum, as illustrated in FIG. 5 (X).

Figure 5X:
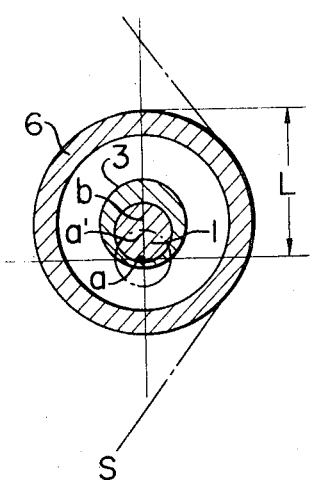
FIG. 5X, 5Y and 5Z are transverse sectional views taken along a cross-section adjacent to the middle of the central shaft, for the purpose of illustrating how to adjust the altitude of the chord of a rubber roll, wherein there are shown the relative dispositions of the central shaft, an eccentric bush and the rubber roll in the normal position (FIG. 5X) and adjusted positions (FIG. 5X and 5Z) respectively.
Figure 5Y:
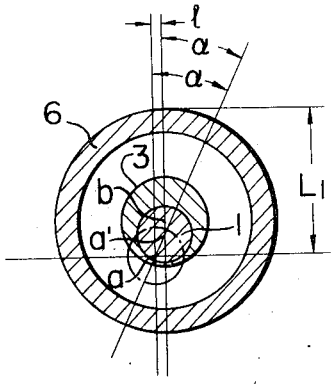
Figure 5Z:
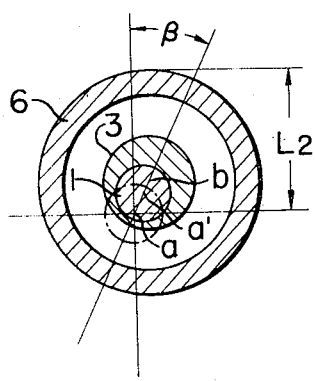
Figure 3:
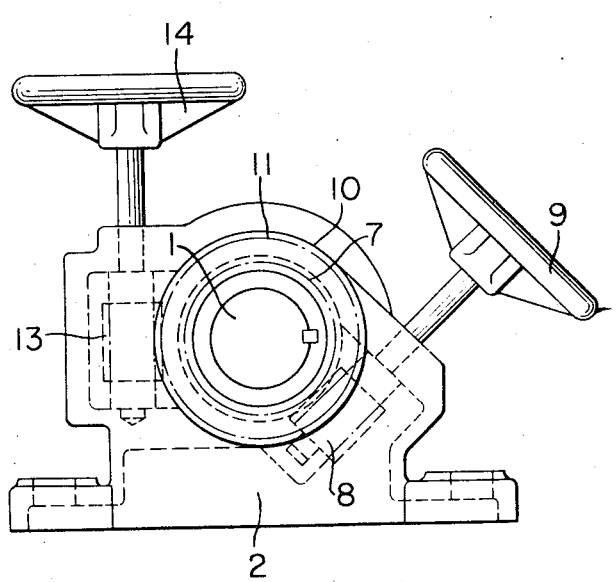
FIG. 3 is an end view taken at the left end of the embodiment in FIG. 1.
Figure 4:
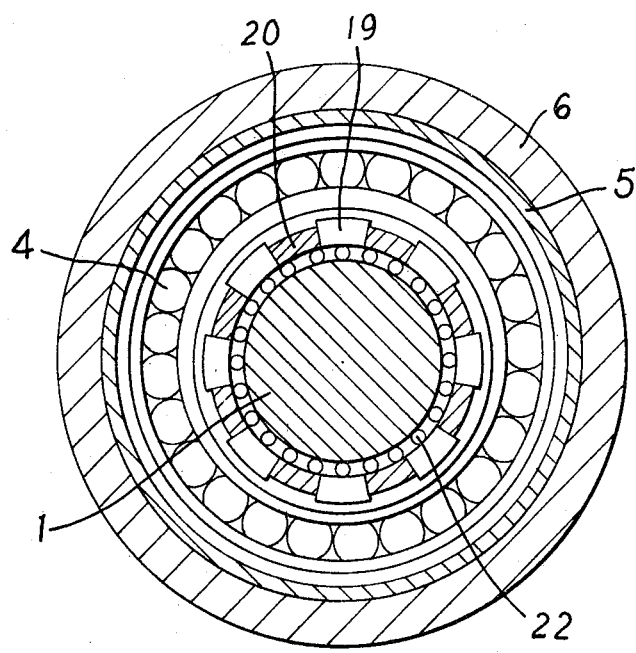
FIG. 4 is a cross-sectional view on an enlarged scale, taken along the line IV—IV in FIG. 1.

In FIGS. 5X, 5Y and 5Z, there are shown cross-sections of the rubber roll, the eccentric bush and the central shaft taken at the middle of the central shaft, together with a broken line corresponding to the cross-section of the imaginary position of a non-bent central shaft i.e., as taken at the center of bearing 2.

Further, as seen in FIGS. 5X, 5Y and 5Z, the center of the cross-section of an imaginary non-bent central shaft is denoted by a, while the center of the cross-section of the actual bent shaft at the middle is denoted by $a'$ and the center of the cross-section of the eccentric bush, equivalent to that of the rubber roll, is denoted by $b$.

Accordingly, when the largest altitude of the chord is required, the points $a$, $a'$ and $b$ should be aligned on a perpendicular line as shown in FIG. 5X.

On the other hand, when a decreased altitude of the chord is required, the rubber roll should be displaced to a slant position as shown in FIGS. 5Y or 5Z.

That is; in the position of FIG. 5Y, a segment of line $a$–$a'$ is inclined by an angle $\alpha$ with respect to a perpendicular line passing through the point of $a$ and thereby $a'$ is moved transversely by a distance $l$ from said perpendicular line and accordingly the point $b$ is displaced onto the perpendicular line passing through the point $a'$, while in the latter position of FIG. 5Z, the points $a'$ and $b$ are positioned on a line inclined by an angle $\beta$ with respect to a perpendicular line passing through the point $a$.

As the result, the maximum altitude L is decreased to the altitudes $L_1$ and $L_2$, respectively.

OPERATION

Now, hereinunder the description will be made regarding how to adjust a altitude of the chord, with respect to an embodiment of the present invention.

In order to achieve the adjustment illustrated in FIG. 5Y, first of all the front cover 10 of the bearing 2 should be released from the bearing casing by turning backwardly the fastening bolts, so as to loosen the fixation of the worm gear 7 to said bearing.

Then the worm gear 7 is rotated to cause rotation of the central shaft 1. The rotation of the central shaft 1 in turn results the inclination of the segment of line $a$–$a'$ against a perpendicular line passing the point $a$ and concurrently a movement of the point $a$ in $a'$ horizontal direction.

When the inclination reaches the angle of $\alpha$ and a horizontal movement so far as to the distance $l$, fixation should be effected again between the bearing 2 and the worm gear 7 by tightening the fastening bolts.

During the foregoing operation of the central shaft 2, because the connecting collar 12 is secured fast to the bearing 2 through the the worm gear 11 and the worm 13, said connecting collar remains stationary and so does the connecting sleeve 16, the endmost bush 3, and the internal bushes 3′, Accordingly, the center $b$ of the rubber roll 6, which is equivalent to the center of the bush 3′ located adjacent to the middle of the central shaft, moves in the horizontal direction by a distance of $l$ from the perpendicular line passing the point $a$, just as does the center $a'$ of the central shaft at the middle thereof.

As the result, the altitude of the chord L, illustrated in FIG. 5X showing a normal position, is decreased to $L_1$ as illustrated in FIG. 5Y showing an inclined position.

Next, in order to achieve the adjustment illustrated in FIG. 5Z first, the central shaft 1 is inclined by an angle $\beta$ in the same way of operation as in the case of FIG. 5Y.

Thereafter, the worm 13 and worm gear 11 engaged with said worm 13 are rotated by the handle 14, so as to cause the connecting collar 12, the connecting sleeve 16, eccentric bushes 3,3′ and tubular coupling members 21 to rotate relative to the central shaft 1 by an angle $\beta$.

Then the center $b$ of the rubber roll 6 is inclined at an angle $\beta$ with respect to the segment of line $a$–$a'$ and thereby the altitude of the chord is changed from L to $L_2$.

It should be understood that above description has been made strictly as regards the construction and function of a preferred embodiment of the present invention.

What is claimed is:

1. An expanding roll construction, comprising:
an elongated longitudinally curved central shaft whose radial deflection, with respect to an imaginary straight line corresponding to the longitudinal axis of a non-curved central shaft, increases from the ends thereof toward the longitudinal midpoint thereof;
a plurality of discs eccentrically mounted on said central shaft for rotation with respect thereto, said discs being spaced apart lengthwise along said central shaft and having eccentricities which increase successively toward the longitudinal midpoint of said central shaft;
a plurality of sleeves supported by said discs so that said sleeves can rotate with respect to said discs;
a rubber roll covering said sleeves and integrated therewith to form a single rotatable unit;
a plurality of tubular coupling members rotatably mounted on said central shaft and disposed between said discs and drivingly connected to said discs;
journal means journaling said central shaft for rotation about said axis;
releasable means for normally holding said central shaft against rotation in said journal means, said releasable means, when released, permitting rotation of said central shaft;
and rotating means for rotating said coupling members and thereby said discs with respect to said central shaft, said rotating means being mounted on a portion of said central shaft outside of said roll.

2. An expanding roll construction according to claim 1, wherein said rotating means includes a worm gear fixedly fitted around a tubular connecting collar and a worm disposed within one of said journal means and engaged with said worm gear.

3. An expanding roll construction according to claim 1, wherein said coupling members has teeth at both axial ends thereof, the opposing sides of the discs also having teeth drivingly engaged with the teeth of said coupling members.

4. An expanding roll construction according to claim 1, wherein an endmost coupling member extends beyond the end of said roll and is drivingly connected to said rotating means.

5. An expanding roll construction according to claim 2, in which an endmost coupling member is drivingly connected to said connecting collar.

* * * * *